Figure 4:
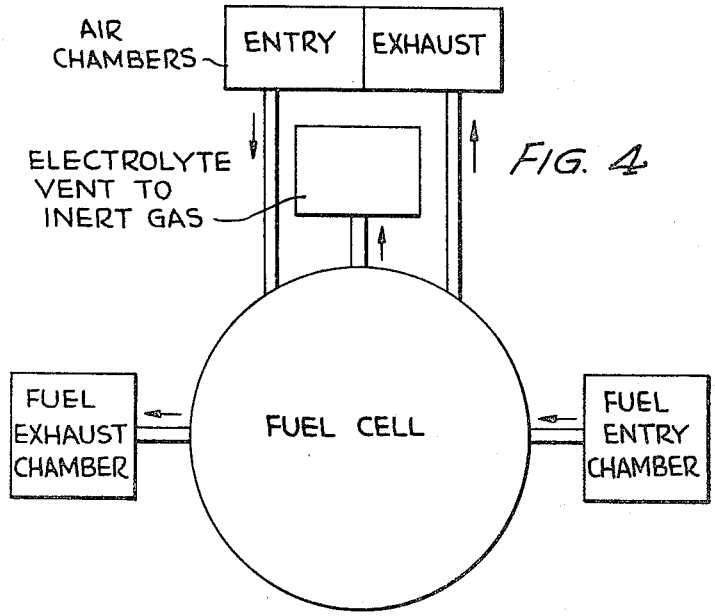

March 14, 1967  J. C. DELFINO  3,309,229
FUEL CELL MODULE
Filed June 18, 1962  3 Sheets-Sheet 1
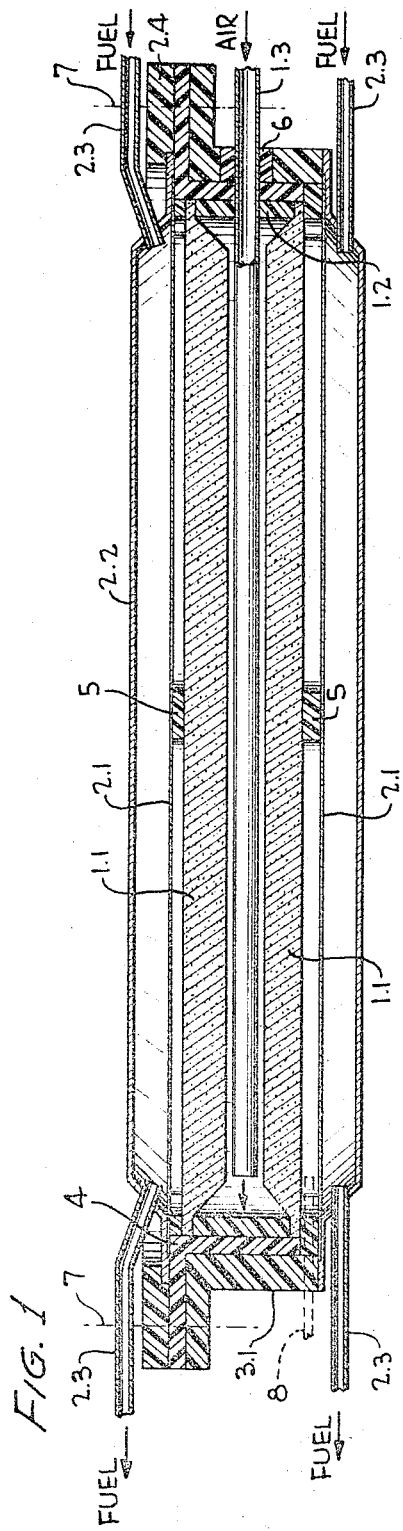
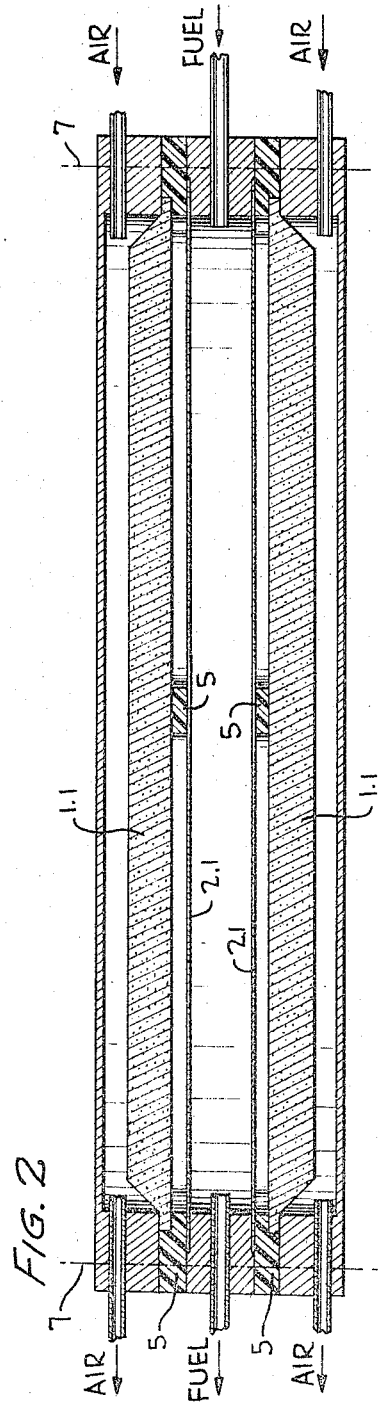
INVENTOR
JOSEPH C. DELFINO
BY Watson, Cole, Grindle & Watson
ATTORNEYS

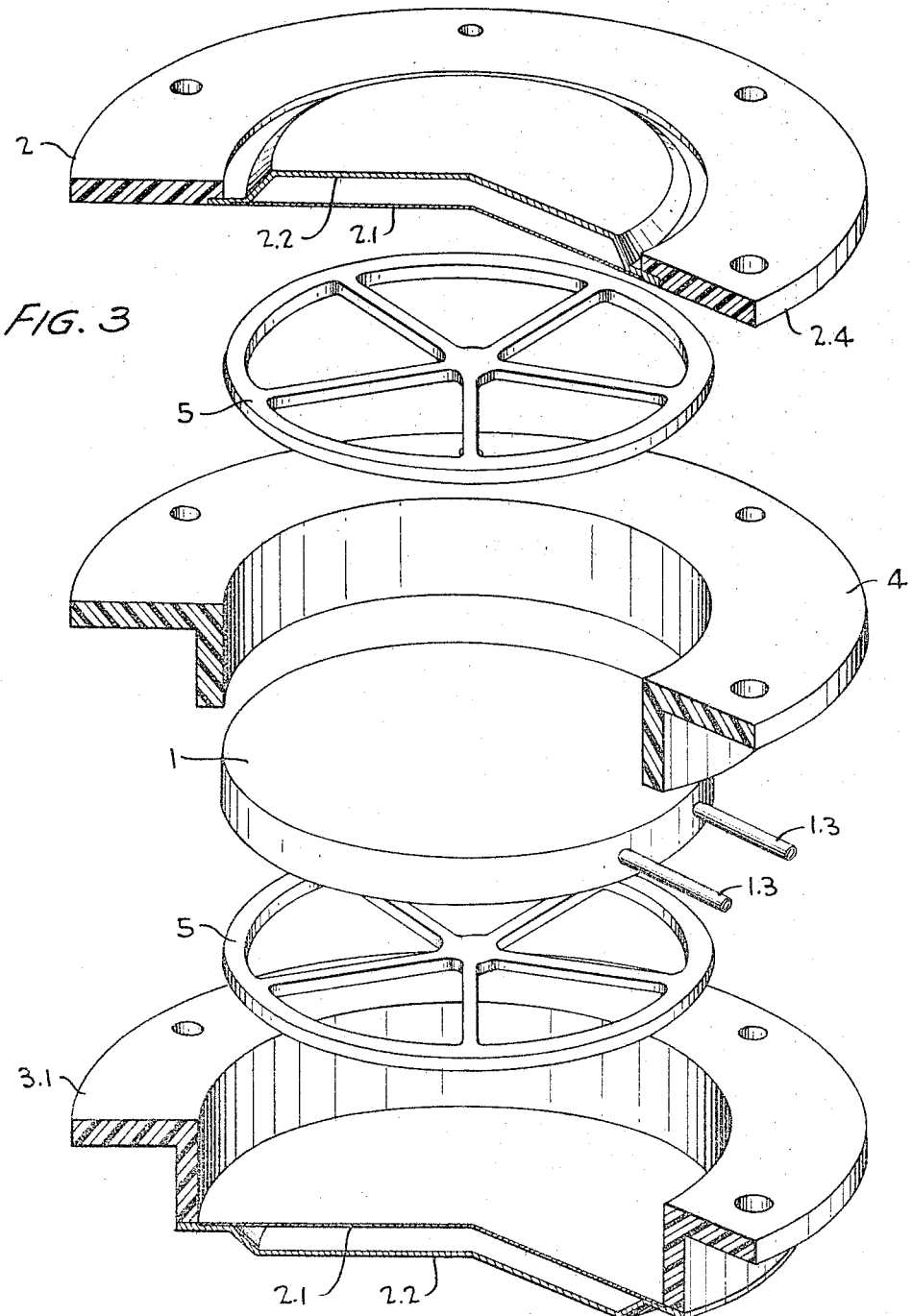

March 14, 1967 J. C. DELFINO 3,309,229
FUEL CELL MODULE
Filed June 18, 1962 3 Sheets-Sheet 3

INVENTOR
JOSEPH C. DELFINO

BY Watson, Cole, Grindle & Watson
ATTORNEYS

United States Patent Office 3,309,229
Patented Mar. 14, 1967

3,309,229
FUEL CELL MODULE
Joseph C. Delfino, Mamaroneck, N.Y., assignor to Leesona Corporation, Warwick, R.I., a corporation of Massachusetts
Filed June 18, 1962, Ser. No. 203,057
5 Claims. (Cl. 136—86)

This invention relates to an improved fuel cell. More particularly, it relates to the construction of a fuel cell module which contains two complete cells. The novel module design permits the stacking of any number of units connected in series or parallel to obtain the required voltage or increased amperage.

A fuel cell according to the instant specifications is a device which converts the energy of a chemical reaction between a fuel and oxidizer directly into low voltage, direct current electricity. Thus, the basic problem encountered in obtaining an efficient system is essentially one of chemical kinetics. It is necessary to carry out the reaction of the fuel and oxidant so that the amount of energy degraded into heat is as small as possible. At the same time the reaction rate must be high enough to economically produce sufficient current output from a practical sized cell.

A typical cell in its most simplified form consists of a housing, a fuel electrode, an oxidizing electrode, an electrolyte positioned between the electrodes and means for the introduction of the fuel and oxidant to their respective electrodes. In operation the fuel enters the anode or positive side of the cell and impinges on the electrode at a fuel-electrolyte interface of the anode, the fuel reacts with an ionic oxidizing agent leaving the electrode electrically charged. The electric charges are drawn off through an external route to generate more of the oxidizing ions at the cathode. These then migrate to the anode to complete the circuit.

Fuel cells are particularly attractive commercially because of the cells potential performance characteristics. Thus, in comparison with a conventional battery, a fuel cell has a longer possible life time, less weight on a kilowatt hour per pound basis, higher efficiency, lower heat and simpler design. In comparison with a gas turbine, a fuel cell's efficiency will range from about 40% to 90% compared with about 30% for the gas turbine. Since there is no combustion within the cell, fuel cells are not subject to Carnot's heat law which states that the heat output of a device is equal to the amount of heat input minus internal losses.

Despite the potential advantages of a fuel cell, prior art units have not been completely practical from a commercial standpoint since they generally cannot deliver high current or high voltages. Thus, to obtain increased voltages or high currents, it is necessary that a number of cells be connected in series to raise the total voltages and in parallel to increase the amperage. When this is done the power-to-weight and power-to-volume ratios are considerably cut down, with the ratios being lower than in some batteries. Additionally, the prior art cells require a considerable amount of auxiliary equipment including feed lines, valves, pressure sensors, controls, heat exchangers, etc., for operation, thereby increasing the cumbersomeness of the system. At a further disadvantage, fuel cell systems employing the prior art homoporous and bi-porous fuel electrodes are confronted with inherent problems due to blocking of the pores with inert or unconsumed gases or flooding of the pores with electrolyte.

Accordingly, it is an object of the instant invention to provide a fuel cell module which has a low space requirement per unit cell.

It is another object of the invention to provide a fuel cell module which has a high power-to-weight and high power-to-volume ratio.

It is another object of the invention to provide fuel cell modules which can be stacked and connected in series or parallel to raise the total voltage or amperage in the cell.

It is another object of the invention to provide a fuel cell system which reduces to a minimum the amount of auxiliary equipment needed for operation.

These and other objects of the invention will become more apparent from the following detailed description with particular emphasis being placed on the illustrative drawing and working embodiment.

In accordance with the instant invention, a fuel cell is constructed from a non-porous palladium-silver alloy hydrogen diffusion anode, a homo-porous or bi-porous cathode, and an aqueous electrolyte. The cell is characterized by either a double anode or double cathode. In the drawing, FIGURE 1 is an illustration of a fuel cell module having a double cathode according to the instant invention. FIGURE 2 is a second embodiment of the instant invention illustrating a double anode. FIGURE 3 is an exploded view, partly in cross-section, of the fuel cell of FIGURE 1. FIGURE 4 is a diagrammatic drawing of the fuel cell system of FIGURE 1 including the ancillary hardware. FIGURES 5, 6, 7 and 8 are illustrative of the back-up plates employed in the instant cells. Although the cell as illustrated in the drawing is circular, other configuration can be employed.

The fuel cell modules shown in FIGURES 1 and 2 are extremely compact units permitting the stacking of any number of modules to obtain the required voltage or amperage. Inasmuch as the modules, as a characteristic feature, employ a double cathode or double anode they possess a decided space-saving advantage. In other words, the double anode of the assembly or double cathode is fed by a common oxygen or fuel feed. Additionally, each unit has its own electrolyte. Thus, in operation, if one module of the cell becomes defective, it is a simple matter to replace the defective module, or to disconnect the module from the system without physically removing it. Since the anode employed is a non-porous palladium-silver alloy membrane, salvage value of the module is high. As is apparent, in a homo-porous or bi-porous electrode structure the most substantial cost of the electrode is in its manufacture to obtain uniform porous openings. However, the processing of the palladium-silver alloy anodes is relatively inexpensive, the major expense being in the cost of the actual membrane. Substantially all of the cost can be regained by recovering the membrane from the damaged module.

In the construction of the cells, it is preferred that the gas feed and gas vent of the anode be diametrically opposed, with the arrangement permitting better purging of the fuel cell system. However, it is not necessary that the fuel inlet and outlet be diametrically opposed, it being possible to have the fuel inlet and outlet at up to substantially right angles and still obtain effective performance.

Referring more partciularly to the drawing, in FIGURE 1 the module contains a double cathode assembly 1, made of two bi-porous cathode, 1.1, attached back-to-back to a metal separator 1.2, and including gas ports 1.3 for entry and exit of air. Anode assembly 2 consists of a palladium-silver alloy membrane 2.1 welded or brazed to a metal back-up plate 2.2. The back-up plate is shaped to form a gas chamber behind the anode and has two diametrically opposed gas ports 2.3 welded to it for entry and exit of hydrogen. In addition, a clamping ring 2.4 is welded to the back-up plate. Anode assembly 3 is identical to assembly 2, except that the clamping ring is replaced by flanged cylinder 3.1 welded to the back-up plate. The cylinder serves as a container for the cathodes and electrolyte. Teflon insulator 4 insulates the cathode from the anode cylinder and serves as a sealing gasket between the flange and clamping ring. Teflon spider 5 controls the gap between the anode and cathode, which space is filled with electrolyte. Thus, the thickness of the Teflon spider determines the electrolyte volume. Additionally, the Teflon spider supports the electrodes against gas pressure. Teflon bushing 6 insulates the cathode gas ports from the anode housing. The complete assembly is bolted together with bolts 7.

FIGURE 2 is similar to FIGURE 1, however, the position of anodes and cathodes are reversed, i.e., the anode is the inner electrode. In this design, the entry and exit ports for the air cathodes are diametrically opposed. Further, the use of back-up plates for the anode can be eliminated, with the anode chamber being formed by a support complex, welded or brazed to both anode elements. This assembly is particularly advantageous in that if a module is damaged the salvage value is higher, i.e., the palladium-silver alloy membrane can be recovered and re-used, whereas, the bi-porous cathodes are substantially a complete loss. As noted hereinbefore, the major cost of a homo-porous or bi-porous electrode is in their manufacture.

FIGURE 3 illustrates the instant fuel cell modules in a partially cross-sectional exploded view. As is apparent from this view, the individual modules can be stacked or cascaded to provide a fuel cell system which will produce electrical current at substantially any voltage or amperage, depending upon whether the modules are connected in parallel or series. The fuel and oxygen can be supplied to the several modules from a common source by means of a manifold.

FIGURE 4 is a diagrammatic illustration of the novel fuel cell seystems showing the auxiliary equipment needed. The filling of the system with electrolyte can be carried out prior to assembly, or after assembly by means of a filling port. Thus, in FIGURE 1 filling port 8 is illustrated in broken lines.

Figure 5:
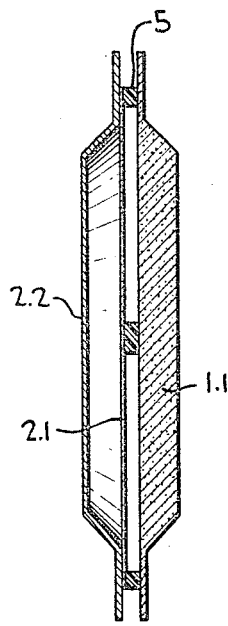

In the instant fuel cell modules, the back-up plates for the anode, particularly when the anodes are in the exterior position as in FIGURE 1, are necessary to support the thin palladium-silver membrane. However, a number of modifications of the back-up plate are possible and will be apparent to a skilled technican. Thus, FIGURES 5, 6, 7 and 8 illustrate a number of alternative designs. In FIGURE 5, Teflon spider 5 functions as a mutual support for both the anode 2.1 and cathode 1.1. In addition, the anode is supported by back-up plate 2.2.

Figure 6:
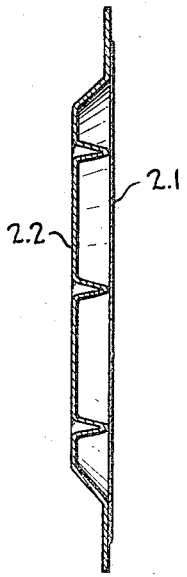

In FIGURE 6 back-up plate 2.2, constructed from a metal such as nickel, is dimpled and spot-welded at the dimples to the palladium-silver alloy membrane 2.1.

Figure 7:
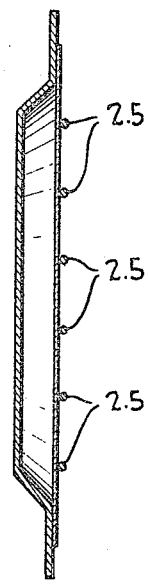

In FIGURE 7 support bars 2.5 are positioned adjacent the palladium-silver alloy membrane to provide support.

Figure 8:
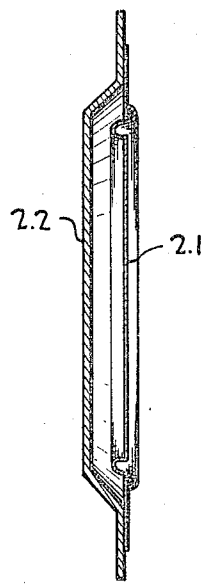

In FIGURE 8, the palladium-silver alloy membrane 2.1 is corrugated peripherally which allows for expansion due to hydrogen gas absorption. Thus, the membrane is not rigid and not subject to stresses induced due to the operation of the cell.

In the present invention, the metal employed in manufacturing the fuel cell module can be any metal which will withstand the corrosive influences of the electrolyte at the operating temperatures of the cell. Because of its availability and its high resistance to corrosion, nickel is a preferred metal. The insulating material in the cell, including the spider, clearly shown in FIGURE 3, can be constructed from any electrical insulator which will withstand the corrosive influences of the fuel cell assembly at the operating temperatures of the cell. Because of its superior characteristics such as resistance to corrosion and its nature permitting convenient machining of parts, etc., Teflon is a preferred material.

The anode employed in the instant fuel cell modules, as noted hereinbefore, is a non-porous palladium-silver alloy hydrogen diffusion membrane. Alloys containing from about 5-45% of silver have been demonstrated to produce good results with alloys composed of from about 20-35% silver showing optimum fuel cell electrode characteristics. At times it may be desirable to include minor amounts, this is, up to about 5% of an additional metal such as gold, tellurium, iridium or rhodium in the palladium-silver alloy. The thickness of the non-porous palladium-silver alloy membrane depends to a large extent upon the pressure differential to be applied across the membrane and upon the rapidity of diffusion desired. Diffusion of hydrogen gas through the membrane is proportional to pressure differential across the electrode structure and the membrane's thickness. The minimum thickness is immaterial as long as the membrane is structurally able to withstand the necessary pressure of the fuel cell. Thus, it is usually desirable to use extremely thin membranes and support the membrane by external means, both from the standpoint of diffusion and economics. The preferred thickness of the membrane is approximately 0.5 to 10 mils. However, membranes of up to about 30 mils can be employed. Although the major portion of the electrode is constructed as a flat sheet, depending upon the support means, as is apparent from FIGURES 4–8, it may be desirable to form the membrane to corrugate at least part of the anode structure.

While the anode can be an unactivated non-porous palladium-silver alloy membrane, it is preferred to apply a thin coating of black to the membrane to enhance the electrochemical performance characteristics, as well as protect the electrode against poisoning. The black can be palladium, platinum, palladium-rhodium, or rhodium. However, it has been found that palladium, at least on the fuel gas side of the anode, provides superior electrochemical characteristics. Additionally, palladium black has a greater tendency to adhere to the non-porous palladium-silver membrane and, therefore, is preferred. The blacks employed are obtained by known prior art means and can be deposited on the anode by electrolytic deposition. The palladium-silver anodes employed herein are described more fully in the Oswin and Oswin et al. copending applications, Ser. Nos. 51,515, now U.S. Patent No. 3,092,517, and 190,695, filed Aug. 24, 1960, and Apr. 27, 1962, respectively. These applications provide a complete description of the unactivated anodes, the activated structures and methods of providing the activated anodes.

The cathodes can be either homo-porous or bi-porous structures known in the prior art. The electrodes described by Francis T. Bacon in U.S. Patent No. 2,716,670 are particularly desirable. These electrodes are bi-porous nickel electrodes having a surface coating of lithiated nickel oxide. The lithiated nickel oxide film is highly resistant to oxidation, but yet readily conducts an electric current. Other cathodes found particularly effective are the cobalt-nickel activated bi-porous nickel electrodes, described more fully in the Lieb et al. co-pending application, Ser. No. 165,212, filed Jan. 9, 1962, entitled "Fuel Cell Electrodes," now abandoned.

The instant cells are hydrogen-oxygen or hydrogen-air systems. As is apparent, only hydrogen fuel can be employed with the hydrogen diffusion anode. Such systems are of particular interest since a hydrogen-oxygen cell has a higher theoretical output than any other known fuel-oxidizer combination. The waste product of the hydrogen-oxygen cell formed after the gases have reacted is water, which can be conveniently removed from the electrolyte. Inasmuch as the anode is non-porous, water formation cannot occur in the electrode structure but is formed only at the electrolyte side of the anode. This eliminates the problem of electrode flooding, noted as being a common problem with the bi-porous and homo-porous structures. Additionally, since only hydrogen is diffused through the activated non-porous palladium-silver alloy membrane, impure hydrogen containing carbon dioxide, carbon monoxide, water, methane, etc., can be used as the fuel. Pure hydrogen will diffuse through the membrane and the gaseous impurities are vented from the system. The impurities, being retained in the fuel compartment, cannot contaminate the electrolyte or block the electrode.

The instant fuel cell systems are operable within a fairly wide temperature range. However, for good hydrogen diffusion through the non-porous palladium-silver alloy membrane, it is desirable that the temperature of the system be in excess of about 25° C. and preferably not over 350° C., the optimum temperature range being in the neighborhood of 100° C. to 300° C.

The instant cells can be operated with either air or oxygen as the oxidizing agent. Additionally, a variety of electrolytes can be employed including aqueous alkaline materials such as potassium hydroxide, sodium hydroxide, lithium hydroxide, mixtures thereof, potassium carbonate and the alkanolamines. Acid electrolytes can be employed including sulfuric and phosphoric acids. If an acid electrolyte is selected, it can be advantageous to coat the surface fronting the electrolyte with platinum black due to its exceptional resistance to attack by acids.

A fuel cell substantially identical to that shown in FIGURE 1 of the drawing was constructed employing a palladium black activated non-porous palladium-silver alloy hydrogen diffusion anode having a thickness of 5 mils. The double cathode was a bi-porous cobalt-nickel activated nickel electrode, more completely described in the aforementioned Lieb et al. copending application, Ser. No. 165,212. The electrolyte was a 75% aqueous potassium hydroxide solution. The operating temperature of the cell was 200° C. Impure hydrogen was fed into the system with pure hydrogen diffusing through the anode and the impurities being vented. Air was fed to the cathode. The cell at .945 volt, including 50 millivolts electrolyte IR drop, drew a current of 150 ma./cm.$^2$.

While various modifications of this invention are described, it should be appreciated that this invention is not restricted thereto, but that other embodiments will be apparent to one skilled in the art which fall within the scope and spirit of the invention and appended claims.

What is claimed is:

1. A self-contained fuel cell module suitable for cascading containing two complete cells comprising a two-piece outer housing, a first electrode having a first polarity, a second electrode having a second and opposite polarity from said first polarity, a third electrode having said second polarity, a fourth electrode having said first polarity, said electrodes being spacially arranged in the aforesaid order, insulating means separating said electrodes from each other and from said housing, an electrolyte space defined between the electrodes of opposite polarity, a reactant compartment adjacent to the surface not in contact with the electrolyte space of each of said first and fourth electrodes, said compartments being defined by the module housing and electrode and having opposed inlet and outlet means and a third reactant compartment having inlet means defined between said second and third electrodes, the pair of electrodes having a positive polarity comprising non-porous palladium/silver alloy hydrogen diffusion membranes.

2. A self-contained fuel cell module suitable for cascading containing two complete cells comprising a two-piece outer housing, a first anode assembly containing a non-porous palladium-silver alloy membrane attached to a metal back-up plate, said back up plate being shaped to form a gas chamber behind said palladium-silver alloy membrane and having two diametrically opposed gas ports, a double cathode assembly containing two porous cathodes attached back to back to a metal separator, said bi-porous cathodes having gas ports positioned between said cathodes for entry and exit of air feeding both cathodes and a second anode assembly containing a non-porous palladium-silver alloy membrane attached to a metal back up plate, said back up plate being shaped to form a gas chamber behind the anode and having two diametrically opposed gas ports, said anodes and cathodes being separated by spacing and support means, said spacing containing an electrolyte.

3. The fuel cell module of claim 2 wherein the spacing and support means are Teflon spiders.

4. A self-contained fuel cell module suitable for cascading containing two complete cells comprising a two-piece outer housing, a first cathode assembly containing a porous cathode attached to a support plate, said cathode in conjunction with said housing being shaped to form a gas chamber behind said cathode and having two opposed gas ports, a double anode assembly containing two non-porous palladium-silver alloy membranes attached back to back to a metal separator, said anodes having common gas ports positioned between said anodes for entry and exit of hydrogen fuel feeding both anodes, and a second cathode assembly containing a porous cathode attached to a support plate, said cathode in conjunction with said housing being shaped to form a gas chamber behind said cathode and having two opposed gas ports, said anodes and cathodes being separated by spacing and support means, said spacing containing an electrolyte.

5. The fuel cell module of claim 4 wherein the spacing and support means are Teflon spiders.

References Cited by the Examiner

UNITED STATES PATENTS

| 409,366 | 8/1889 | Mond et al. | 136—86 |
|---|---|---|---|
| 2,860,175 | 11/1958 | Justi | 136—86 |
| 2,925,455 | 2/1960 | Eidensohn | 136—86 |
| 3,126,302 | 3/1964 | Drushella | 136—86 |
| 3,180,762 | 4/1965 | Oswin | 136—86 |

FOREIGN PATENTS

| 350,100 | 8/1905 | France. |
|---|---|---|
| 667,298 | 2/1952 | Great Britain. |
| 850,706 | 10/1960 | Great Britain. |

WINSTON A. DOUGLAS, *Primary Examiner.*

JOHN R. SPECK, H. FEELEY, *Assistant Examiners.*